United States Patent [19]
Nigro

[11] Patent Number: 6,146,453
[45] Date of Patent: *Nov. 14, 2000

[54] METHOD AND APPARATUS FOR RECOVERING AND RECYCLING SLUDGE AND PRODUCT THEREOF

[76] Inventor: August M. Nigro, c/o Canal Asphalt 800 Canal St., Mt. Vernon, N.Y. 10550

[ * ] Notice: This patent issued on a continued prosecution application filed under 37 CFR 1.53(d), and is subject to the twenty year patent term provisions of 35 U.S.C. 154(a)(2).

[21] Appl. No.: 09/231,012

[22] Filed: Jan. 14, 1999

Related U.S. Application Data

[60] Provisional application No. 60/101,049, Sep. 18, 1998.

[51] Int. Cl.$^7$ .......................... C02F 11/12; C09D 195/00; B01D 1/00; A62D 3/00; B09B 3/00
[52] U.S. Cl. ...................... 106/281.1; 106/283; 210/747; 210/768; 210/803; 588/256
[58] Field of Search ................................ 106/281.1, 283; 210/747, 768, 803; 588/256

[56] References Cited

U.S. PATENT DOCUMENTS

| | | | |
|---|---|---|---|
| 1,240,481 | 9/1917 | Popkess | 106/281.1 |
| 2,220,714 | 11/1940 | Hersberger . | |
| 4,052,291 | 10/1977 | Espenscheld et al. | 208/4 |
| 4,053,401 | 10/1977 | Fukushima et al. | 210/52 |
| 4,728,222 | 3/1988 | Wiemer | 405/128 |
| 5,173,115 | 12/1992 | Glynn, Jr. et al. | 106/281.1 |
| 5,355,594 | 10/1994 | Hwang | 34/356 |
| 5,470,455 | 11/1995 | Santos | 208/4 |
| 5,601,697 | 2/1997 | Miller et al. | 208/945 |
| 5,728,291 | 3/1998 | Miller et al. | 208/45 |
| 5,795,285 | 8/1998 | McLaughlin et al. | 588/256 |

OTHER PUBLICATIONS

Derwent Acc. No. 1978–56510A, Poletaev et al, "Bitumen Emulsion Road Paving . . . ", Feb. 17, 1975.

*Primary Examiner*—David Brunsman
*Attorney, Agent, or Firm*—Levisohn, Lerner, Berger & Langsam

[57] ABSTRACT

A method by which dredged sludge is used to make a new asphalt composition. The moisture content of the sludge is reduced by allowing the sludge to drain through a filter. The reduced-moisture-content sludge is heated and combined with asphalt mixture. The respective flow rates of the reduced-moisture-content sludge and the asphalt mix is controlled via a computer controller. The moisture-reducing step may include at least one of the steps of stirring, mixing, churning, and turning the sludge, and may also include blowing air onto the sludge. The invention also includes a system for performing the method. The system includes a drainage area, a filter at least partially surrounding the drainage area, a first bin adapted to receive sludge from the drainage area, a conveyor having an input at the drainage area and an output at the first bin, and a rotating drum in communication with the first bin for receiving a flow of the sludge from the first bin. The invention also includes the road paving material made by the above method.

27 Claims, 1 Drawing Sheet

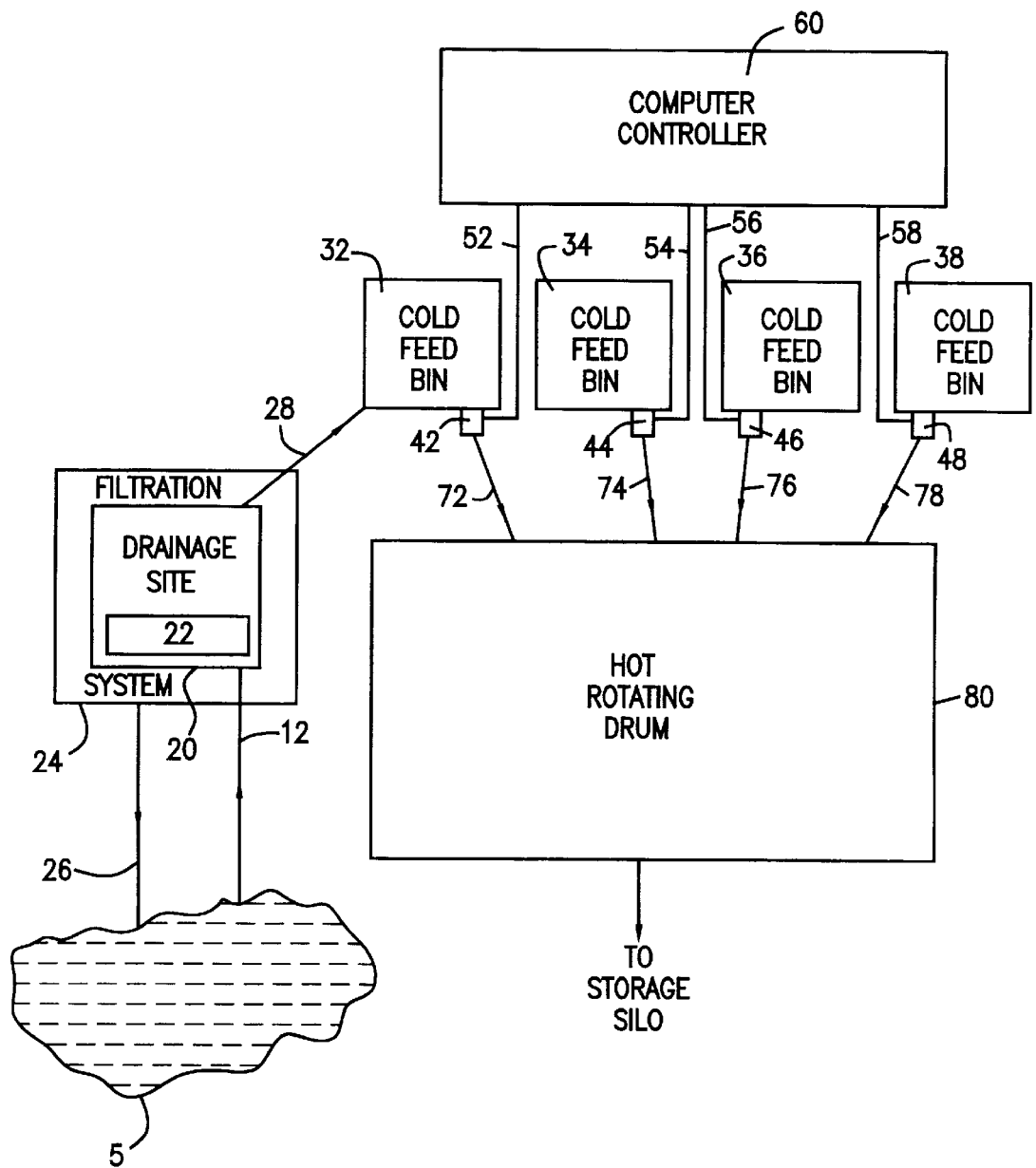

METHOD AND APPARATUS FOR RECOVERING AND RECYCLING SLUDGE AND PRODUCT THEREOF

This application claims benefit of Provisional Appl. 60/101,149 filed Sep. 18, 1998.

BACKGROUND OF THE INVENTION

1. Field of the Invention

The invention relates to a method and apparatus for recovering and recycling sludge from creeks, bays, and other similar bodies of water. More particularly, the invention relates to a method and apparatus for using contaminated sludge from a body of water in an environmentally safe commercial process and the resulting product thereof.

2. Description of Related Art

In many commercially and recreationally active bodies of water, mud/sludge accumulates on the bed or floor in a process known as shoaling. The buildup of sludge can make the body of water extremely shallow in parts or in its entirety. As a body of water becomes more shallow, it becomes less navigable. Moreover, a commercial barge may have to enter the body of water at less than full capacity so that it sits higher in the water and thus does not bottom out or run aground on the built up sludge. From an economic standpoint, the accumulation of sludge substantially reduces the viability of a body of water as a commercial port. Environmentally, the natural filling of the body of water with sludge has a deleterious effect on benthic or bottom-dwelling marine life.

In addition, built up sludge frequently becomes contaminated by storm water from local streets and runoff from industrial sites at or near the shore. Typical contaminants include petroleum-related chemicals having low levels of toxicity.

It is known to dredge the shoaling bay or creek and dump the sludge in a landfill or another body of water. This type of dumping is undesirable as it contaminates the soil and other bodies of water and does not dispose of the contaminants in an environmentally safe fashion. Another known method of dealing with dredged sludge is to burn it at temperatures approaching 1100° F. The main drawback to this soil recovery method is that the contaminants are then vaporized and released into the atmosphere. The problem is thus not solved, merely transferred to a different medium.

SUMMARY OF THE INVENTION

Accordingly, it is an object of the invention to provide a method of using contaminated sludge in a commercial process.

It is another object of the invention to provide a method of removing sludge from bodies of water, recovering and recycling the contaminated sludge so that the contaminants are contained in an environmentally safe manner.

It is another object of the invention to provide a method of using contaminated sludge in an environmentally safe commercial process.

It is another object of the invention to provide a method of using contaminated sludge to make a new asphalt composition.

It is another object of the invention to provide a new asphalt composition that utilizes contaminated sludge.

It is another object of the invention to provide a new asphalt composition that is economical to manufacture.

It is another object of the invention to provide a system for recycling dredged contaminated sludge into a new and useful product.

It is another object of the invention to provide a system for recycling dredged contaminated sludge that generates a usable product.

It is another object of the invention to provide a system for recycling dredged contaminated sludge that produces a road paving material.

The above and other objects are satisfied by the invention, which is a process by which dredged sludge is used to make a new asphalt composition. The inventive method may include the step of dredging sludge from the bottom of a body of water. The method of recycling sludge dredged from the bottom of a body of water includes the following steps. The moisture content of the sludge is reduced, thereby forming reduced-moisture-content sludge. The reduced-moisture-content sludge is heated and combined with asphalt mixture. Preferably, the reducing step includes allowing the sludge to drain, and more preferably includes allowing the sludge to drain through a filter at ambient conditions. Water that drains from the sludge through the filter is preferably directed back to the body of water. In the preferred method, the combining and heating steps are performed simultaneously in a hot rotating drum. Another feature of the combining step of the preferred method includes controlling a first flow rate of the reduced-moisture-content sludge and a second flow rate of the asphalt mix via a computer controller. The moisture-reducing step may preferably include at least one of the steps of stirring, mixing, churning, and turning the sludge, and may also include blowing air (either heated or ambient) onto the sludge. A new asphalt composition useful in road paving results.

In the inventive method, the sludge is first dredged from the body of water and allowed to drain in a holding area to reduce its moisture content. In the preferred embodiment, the heat of the sun is used for a substantial portion of the energy for drying. Preferably, the sludge is surrounded by filtering means such as hay bales, silt fences, or the like to keep the contaminants and silt contained while allowing the water to drain, preferably by gravity back into the body of water. The thus-drained and partially dried sludge is heated to approximately 300° F. and simultaneously combined with conventional asphalt mix (consisting of sand, stone, and liquid asphalt or "binder"). Presently, in one embodiment, the dried sludge mixture is added in approximately a 1:9 ratio with the sand, stone, and binder so that the recovered sludge makes up approximately 10% of the final asphalt product.

The invention also includes a system for recycling sludge from a shoaling body of water. The inventive system includes a drainage area adapted to receive sludge, a filter at least partially surrounding the drainage area, a first bin adapted to receive sludge from the drainage area, a conveyor having an input at the drainage area and an output at the first bin, and a rotating drum in communication with the first bin for receiving a flow of the sludge from the first bin. The system may also include a dredging device for dredging the sludge from the body of water. A drainage conduit, preferably gravity-driven, is preferably provided leading, from the drainage area to the body of water; water that drains out of sludge disposed in the drainage area flows through the filter, through the conduit, and to the body of water. The drainage area may also be provided with an agitator, contactable with sludge disposed in the drainage area, for churning or mixing the sludge, as well as air blowers positioned in proximity to sludge disposed in the drainage area for blowing, air on the sludge.

The system may preferably include a flow regulator and a computer controller connected to the flow regulator via at least one control line, wherein the computer controller controls the flow from a feed bin holding the sludge via the flow regulator to a hot rotating drum. A plurality of other bins, each also in communication with the hot rotating drum, each adaptable to hold at least one of stone, sand, and liquid asphalt binder, may also be provided, each having its own flow regulator. Each flow regulator is respectively connected to the computer controller via a plurality of control lines. The computer controller controls flow rates of the recovered and dried sludge, the stone, sand, and liquid asphalt binder from the bins to the hot rotating drum.

The invention also includes a road paving material made by the above-mentioned system using the above-mentioned method. The inventive material includes sand, stone, liquid asphalt binder, and partially-dried sludge dredged from a bottom of a shoaling body of water. The recovered sludge is allowed to drain prior to being combined with the sand, stone, and liquid asphalt binder. The partially dried sludge preferably makes up approximately 10% of the road paving material. The partially dried sludge includes approximately 10–15% water by weight.

BRIEF DESCRIPTION OF THE DRAWING

The FIGURE is a block flow diagram schematically depicting the method and system of the present invention.

DETAILED DESCRIPTION OF THE DRAWING AND THE PREFERRED EMBODIMENTS

Asphalt or "blacktop" is a construction material used to surface many public roads, parking lots, residential and commercial developments, driveways, airport runways, and the like. Asphalt typically consists of various sizes of stone, a quantity of various grades of sand, and a hot black petroleum-based liquid known as asphalt cement or binder. The stones and sand are typically stored in cold feed bins at ambient conditions and are distributed onto conveyors at predetermined rates. Different types of asphalt require different sizes of stone, different amounts and variety of sand, etc. In the preferred embodiment, these components are introduced into a hot rotating drum which dries and heats the material. The asphalt cement is injected into the hot rotating drum at high temperatures from a separate storage tank. The hot rotating drum mixes the stone, sand, and liquid asphalt. The final mixture is fed onto another conveyor and into an asphalt storage silo, for example. As an alternative, of course, asphalt production according to the invention can be accomplished by a continuous or batch plant process.

The present invention incorporates the sludge that is dredged from shoaling bodies of water into asphalt. First, the sludge is dredged or excavated from the bottom of the body of water. In one embodiment, the dredging is performed by a barge-mounted crane using a clamshell bucket. However, other known dredging methods are contemplated as well; for example, a land-mounted backhoe can be used.

The sludge is then set aside and drained of its moisture. The draining site is preferably adjacent or in close proximity to the body of water being dredged. The sludge is contained by a basic filtration system that allows the water to flow out of the sludge (preferably downhill through channels) while retaining the sediment portion of the sludge. Hay bales and silt fencing perform the filtration function adequately.

According to the inventive method, the sludge is allowed to dry by exposure to ambient air and the sun and by the removal of water by gravity-driven drainpipes or channels. Preferably, the removed water is returned to the body of water from whence the sludge was removed. Preferably, the sludge is stirred or turned at predetermined intervals to allow for even exposure and to expedite drainage. It is desired to reduce the moisture content as much as possible. However, for practical purposes, the sludge is drained to a moisture level of approximately 10–15% water by weight. Additional methods of promoting drying, such as blowing air onto the sludge, may be employed and are considered to be well within the scope of the invention.

Once the sludge is sufficiently dried, it is introduced into a cold feed bin similar to those which store the sand and stone components of asphalt. The sludge is then conveyed to the hot rotating drum along with the sand, stone, and liquid asphalt (collectively "standard aggregate"). In one embodiment, the standard aggregate is added at a rate of approximately 158 tons per hour and the dried sludge is added at a rate of approximately 17 tons per hour.

Description of the invention will now be given with reference to the attached FIGURE. It should be noted that the FIGURE is merely a block flow diagram and should not be construed as being to scale.

Numeral 5 refers to a body of water such as a creek or bay in which the shoaling process is becoming excessive, i.e., sludge is accumulating to levels which threaten both navigation and benthic marine life. A conveying means 12 is provided to remove the sludge from water 5 and deposit it in a drainage site 20. Conveying means 12 may be a crane having a clamshell attachment or similar means typically used for dredging. Sludge is left in drainage site 20 so that the moisture content of the sludge may be reduced. Substantially surrounding drainage site 20 is a filtration system 24. As mentioned above, filtration system 24 may include bales of hay, silt fences, and other similar structure that is water permeable but will capture silt and sediment. Water that drains out of the sludge may preferably be allowed to return to body of water 5 via conduit 26. Conduit 26 may preferably be gravity fed, or a water pump may be used as well. It should be noted that, while the FIGURE depicts a single conduit 26 leading from filtration system 24 to body of water 5, the invention contemplates any number of conduits in any convenient configuration as needed for the given site.

While the sludge is sitting in the drainage site 20 and water is conducted through filtration system 24 to body of water 5, the sludge is turned, stirred, or otherwise agitated to allow for more complete drainage and thus more complete sludge drying. While the sludge could be stirred manually, an agitating mechanism 22 is provided in one embodiment. A typical agitation mechanism may preferably include a large corkscrew-shaped element (not shown) which, when rotated about its axis by a motor (not shown), sifts through the sludge and stirs it. The sludge remains in drainage site 20 until the moisture content is sufficiently reduced. It is preferred to reduce the moisture content to as low a level as possible, however for practical purposes, 10–15% water by weight is acceptable.

Once the sludge is sufficiently dried, it is conveyed to a cold feed bin 32 via a conveyor 28. Cold feed bin 32 is similar to cold feed bins 34 and 36 which hold cold components of asphalt; for example, cold feed bin 34 may contain sand and cold feed bin 36 may contain stone. The FIGURE shows a total of three cold feed bins, however more may be used; for example, separate cold feed bins may be used for different size stone and different types of sand.

All of the cold feed bins 32, 34, and 36 are provided with flow regulators 42, 44, and 46, respectively. A liquid asphalt injector 38 is also provided, and it includes flow regulator 48. Flow regulators 42, 44, 46, and 48 control the rates of flow of the various components that are to be blended to make the new asphalt product. The flow regulators 42, 44, 46, and 48 are each connected to a computer controller 60 via control lines 52, 54, 56, and 58, respectively. That is, computer controller 60 can issue commands to flow regulators 42, 44, 46, and 48 to open, close, move to a certain position, and the like, so that the flow rates of the sand, stone, liquid asphalt, and dried sludge may be selected and varied. In this way, different blends of asphalt may be created by varying the flow rates of the components of the asphalt.

Conduits or conveyors 72, 74, 76, and 78 are in communication with flow regulators 42, 44, 46, and 48, respectively, and convey the partially-dried sludge, sand, stone, and liquid asphalt to hot rotating drum 80. Drum 80 heats the components to approximately 300° F. and mixes them as the drum rotates. After a predetermined amount of time, the asphalt mixture is finished and is conveyed from hot rotating drum 80 to a waiting truck or a storage silo for later use.

The asphalt plant used in the preferred embodiment is a continuous 250 ton per hour throughput hot mix asphalt plant. The plant includes a venturi type, continuous flow drum dryer mixer with intake hopper for feed aggregates and an automatic asphalt compound injection system. The varying amounts of sand, stone, liquid asphalt, and dried sludge are controllable via a computer.

The advantages to the invention over conventional methods are several. First, the heating of the sludge material to merely 300° F. creates significantly smaller amounts of airborne petroleum-based pollution than the conventional method of burning recovered sludge at 1100° F.; this combustion was necessary (prior to the present invention) to remove petroleum-based contaminants from the sludge for location at a landfill or a different body of water. Second, the conventional method involved dumping the dredged sludge somewhere else, into either another body of water or a landfill. Such a method merely redistributes the sludge. By contrast, the inventive method incorporates sludge into paving materials and does not generate landfill or further water pollution. Further, the incorporation of the sludge into asphalt traps the contaminants contained in the sludge in a solid form from which there is little or no leaching. It has been found that an acceptable asphalt is thus produced.

What is claimed is:

1. A method of recycling sludge dredged from the bottom of a body of water, comprising the steps of:
    reducing the moisture content of the sludge, thereby forming reduced-moisture-content sludge;
    heating the reduced-moisture-content sludge; and
    combining said reduced-moisture-content sludge with asphalt mixture.

2. A method according to claim 1, wherein said reducing step comprises the step of allowing the sludge to drain.

3. A method according to claim 2, wherein said reducing step farther comprises the step of allowing, the sludge to drain through a filter at ambient conditions.

4. A method according to claim 1, wherein said reducing step comprises the steps of:
    surrounding the sludge with a filter; and
    allowing water to drain from the sludge through the filter and return to the body of water.

5. A method according to claim 4, wherein the filter includes at least one of hay bales and silt fences.

6. A method according to claim 4, wherein said reducing step further comprises at least one of the steps of stirring, mixing, churning, and turning the sludge.

7. A method according to claim 1, wherein said combining and heating steps are performed simultaneously.

8. A method according to claim 6, wherein said combining and heating steps are performed simultaneously in a hot rotating drum.

9. A method according to claim 1, wherein said combining step further comprises the step of controlling a first flow rate of the reduced-moisture-content sludge and a second flow rate of the asphalt mix via a computer controller.

10. A method according to claim 1, wherein after said reducing step and before said heating and combining steps, the method further comprises the step of transferring the reduced-moisture-content sludge to a cold feed bin.

11. A method according to claim 9, wherein said combining step further comprises transferring said reduced-moisture-content sludge from the cold feed bin to a hot rotating drum.

12. A method according to claim 1, wherein said heating step includes heating said reduced-moisture-content sludge to approximately 300° F.

13. A method according to claim 1, wherein said reducing step further comprises at least one of the steps of stirring, mixing, churning, and turning the sludge.

14. A method according to claim 1, wherein said reducing step further comprises reducing the moisture level of the sludge to approximately 10–15% water by weight.

15. A method according to claim 1, wherein said reducing step further comprises the step of blowing air onto the sludge.

16. A method of recycling sludge comprising the steps of:
    dredging sludge from the bottom of a body of water;
    reducing the moisture content of the sludge, thereby forming reduced-moisture-content sludge;
    heating the reduced-moisture-content sludge; and
    combining said reduced-moisture-content sludge with asphalt mixture.

17. A system for recycling sludge from a shoaling body of water, comprising:
    a drainage area adapted to receive sludge;
    a filter at least partially surrounding said drainage area;
    a first bin adapted to receive sludge from said drainage area;
    a conveyor having an input at said drainage area and an output at said first bin; and
    a rotating, drum in communication with said first bin for receiving a flow of said sludge from said first bin.

18. A system according to claim 17, further comprising dredging means for dredging said sludge from the body of water.

19. A system according to claim 17, said drainage area further comprising a conduit leading to the body of water, wherein water that drains out of sludge disposed in said drainage area flows through said filter, through said conduit, and to the body of water.

20. A system according to claim 17, said drainage area further comprising an agitator, contactable with sludge disposed in said drainage area, wherein said agitator churns or mixes the sludge.

21. A system according to claim 17, said drainage area further comprising air blowers positioned in proximity to sludge disposed in said drainage area, said air blowers blowing air on said sludge.

22. A system according to claim 17, wherein said first bin is a cold feed bin and said rotating drum is a hot rotating drum.

23. A system according to claim 22, further comprising:
a flow regulator in communication between said cold feed bin and said hot rotating drum; and
a computer controller connected to said flow regulator via at least one control line, wherein said computer controller controls said first flow from said cold feed bin via said flow regulator.

24. A system according to claim 23, further comprising:
a plurality of secondary bins, each in communication with said hot rotating drum, each adaptable to hold at least one of stone, sand, and liquid asphalt binder; and
a plurality of secondary flow regulators, each respectively in communication between said secondary bins and said hot rotating drum, each respectively connected to said computer controller via a plurality of secondary control lines,
wherein said computer controller controls second flow rates of said stone, sand, and liquid asphalt binder to said hot rotating drum.

25. A road paving material, comprising:

sand;

stone;

liquid asphalt binder; and partially dried sludge dredged from a bottom of a shoaling body of water, wherein said partially dried sludge was drained of some water content prior to being combined with said sand, stone, and liquid asphalt binder.

26. A road paving material according to claim 25, wherein said partially dried sludge makes up approximately 10% of said road paving material.

27. A road paving material according to claim 25, wherein said partially dried sludge comprises approximately 10–15% water by weight.

* * * * *